US008103167B2

(12) United States Patent
Tidhar (10) Patent No.: US 8,103,167 B2
(45) Date of Patent: Jan. 24, 2012

(54) SYSTEM FOR FREE SPACE OPTICAL COMMUNICATION AND METHOD FOR OPERATION THEREOF

(75) Inventor: Gil Tidhar, Modlin (IL)

(73) Assignees: Elta Systems Ltd., Ashdod (IL); Optigo Systems Ltd., Lod (IL)

( * ) Notice: Subject to any disclaimer, the term of this patent is extended or adjusted under 35 U.S.C. 154(b) by 350 days.

(21) Appl. No.: 12/436,950

(22) Filed: May 7, 2009

(65) Prior Publication Data

US 2009/0269074 A1    Oct. 29, 2009

Related U.S. Application Data

(63) Continuation of application No. PCT/IL2007/000023, filed on Jan. 9, 2007.

(30) Foreign Application Priority Data

Nov. 7, 2006  (IL) .......................................... 179089

(51) Int. Cl.
*H04B 10/00* (2006.01)
(52) U.S. Cl. ....................................... 398/130; 398/140
(58) Field of Classification Search .................. 398/130, 398/128, 118, 127, 135, 138, 140
See application file for complete search history.

(56) References Cited

U.S. PATENT DOCUMENTS

| 5,301,051 | A | 4/1994 | Geller | |
|---|---|---|---|---|
| 7,233,745 | B2 * | 6/2007 | Loechner | 398/128 |
| 2001/0035995 | A1 * | 11/2001 | Ruggiero | 359/152 |
| 2003/0020992 | A1 | 1/2003 | Child | |
| 2006/0280505 | A1 * | 12/2006 | Varshneya et al. | 398/140 |

FOREIGN PATENT DOCUMENTS

EP    0483549 A2    5/1992

OTHER PUBLICATIONS

International Search Report and Written Opinion, mailed May 30, 2007, from International Application No. PCT/IL2007/000023, filed on Jan. 9, 2007.

(Continued)

*Primary Examiner* — M. R. Sedighian
(74) *Attorney, Agent, or Firm* — Houston Eliseeva, LLP.

(57) ABSTRACT

A free space optical communication system is described that comprises a receiver node and a transmitter node communicating to each other via a control data communication channel and an information data communication channel operating at a wavelength region different from the wavelength region of the control data communication channel. The receiver node includes a receiver unit configured to receive an information data signal provided by the transmitter node through the information data communication channel, and to recover information from said information data signal; an interrogator unit configured for generating and radiating an interrogation data signal through the control data communication channel in order to initiate and terminate an information data communication session between the receiver node and the transmitter node; and a receiver node controller configured for controlling operation of the receiver unit and the interrogator unit. The transmitter node includes a responder unit configured to locate the presence of the interrogator unit; a transmitter unit configured to receive the data from an information source, generate and radiate the information data signal through the information data communication channel to the receiver unit; and a notifier unit coupled to the transmitter unit and to the responder unit, and configured to control operation thereof.

24 Claims, 4 Drawing Sheets

OTHER PUBLICATIONS

International Preliminary Report on Patentability, dated May 12, 2009, from International Application No. PCT/IL2007/000023, filed on Jan. 9, 2007.

Carruthers, J. B. et al., "Angle Diversity for Nondirected Wireless Infrared Communication," IEEE Transactions on Communications, vol. 48, No. 6, Jun. 2000, pp. 960-969.

Kahn, J. M. et al., "Imaging Diversity Receivers for High-Speed Infrared Wireless Communication," IEEE Communications Magazine, Dec. 1998, pp. 88-94.

O'Brien, D. C. et al: "High speed integrated optical wireless transceivers for in—building optical LANs," Proc. SPIE vol. 4214, 2001, pp. 104-114, Optical Wireless Communications III, Eric J. Korevaar, Ed.

O'Brien, D. C. at al: "A high-speed integrated optical wireless system demonstrator," Proc. SPIE vol. 4530, 2001, pp. 145-153, Optical Wireless Communications IV, Eric J. Korevaar, Ed.

* cited by examiner

SYSTEM FOR FREE SPACE OPTICAL COMMUNICATION AND METHOD FOR OPERATION THEREOF

RELATED APPLICATIONS

This application is a Continuation of International Application No. PCT/IL2007/000023, filed on Jan. 9, 2007, which claims priority to Israeli Patent Application No. 179089, filed on Nov. 7, 2006, both of which are incorporated herein by reference in their entirety.

FIELD OF THE INVENTION

This invention relates to generally to free space optical communications and, in particular, to a free space optical communication system and methods that employ an information data channel and control channel operating on different bandwidths.

BACKGROUND OF THE INVENTION

A wireless data communication provides a reliable, robust, and efficient means for transmitting information. For example, radio frequency (RF) wireless communication is broadly used in wireless and cellular phones, wireless LAN, etc. However, RF systems have several shortcomings. One of the shortcomings of RF communication is associated with security of the transmitted information, due to the difficulties of controlling the direction of the radiation beam. Moreover, interference of radiation between various RF sources may occur. Likewise, the bandwidth and the number of channels available in a given region can be limited.

Another example of wireless data communication, such as Free Space Optical (FSO) communication can be less susceptible to these limitations. There are two basic FSO configurations according to which the FSO communication technique is based either on non-line-of-sight (diffuse) paths or line-of-sight paths between transmitter and receiver.

For example, diffuse Infrared (DIR) technology is known that enables the use of infrared optical emissions without the need for line-of-sight between the transmit communication node and receive communication node. It can create communication links at distances of over 10 meters (30 feet) or more, depending on the emitted optical power. Unlike a direct infrared signal, which emits light in a narrow beam, creating a line-of-sight, narrow angle communication link, a diffuse infrared device (usually Lambertian source) illuminates the room with an infrared signal, and then utilizes the reflections from the ceiling, walls, floors, and other natural surfaces to maintain robust optical communications.

An example of a Diffused Infra Red (DIR) technique has been proposed by InfraCom Ltd. (www.infra-com.com). This communication method uses 'diffused' reflections (scattering) of optical beams from ceilings, walls, floors, and other similar surfaces that scatter the light to link the transmitter and receiver. The receiver within the coverage space can detect the scattered radiation, which is modulated in order to provide information data transmission.

Non-line-of-sight communication systems are known which utilize modulated omnidirectional ultraviolet radiation in the solar-blind region of the electromagnetic spectrum. For example, U.S. Pat. No. 5,301,051 to Geller describes a system that enables omnidirectional non-line-of-sight simultaneous communications in a number of frequency separated channels in the ultraviolet spectrum. The system includes a plurality of discharge lamps each having at least a single different isotope of mercury for each omnidirectionally radiating a discrete hyperfine line in the ultraviolet spectrum. The hyperfine lines are composed in the 253.7 nm resonance line of a low pressure mercury discharge tube. Each of the discrete lines in the ultraviolet spectrum is modulated by an on-off sequence generator so that modulated discrete lines transmit communications to a number of receivers randomly disposed in a non-line-of-sight relationship to the discharge lamps. Simultaneous communications within the solar blind region are assured for non-line-of-sight transmitters and receivers within a limited range so that communications are not compromised.

Diffuse systems are robust to blocking and do not require that transmitter and receiver are aligned, as many paths exist from transmitter to receiver. However, multipath interference at the receiver can cause InterSymbol Interference (ISI) and the path loss for most systems is high. Thus, due to the high loss of diffused light, DIR is limited to tens of Mbps for the entire communication channel. Moreover, if several transmitters are used in the same room, they need to be time or frequency multiplexed and the total available bandwidth has to be split.

The alternative approach is based on Line of Sight (LOS) paths between transmitter and receiver. Usually, LOS technologies are divided into two groups, such as wide field of view (FOV) systems and narrow FOV systems. Wide FOV systems, for example, may use ceiling mounted transmitters that illuminate the coverage area. Examples of wide FOV techniques are technical solutions of the Infrared Data Association (IrDA) (see, for example, www.irda.org). These solutions are implemented in handsets, PDAs and laptop computers to provide a point-to-point IR non-contact communication link. The wide FOV communication is characterized by wide angle of reception and transmittance cones of 15-30 degrees. The wide FOV devices are relatively easy to use, as the user does not need to point the transmitter exactly at the receiver, and vice versa. The cost of the wide angle reception and transmission cones is limited range (of about few meters) and relatively low bandwidth. As the beams are narrowed, path loss reduces and the allowed bit rate increases, albeit at the cost of coverage.

An example of narrow FOV FSO technique is the FSO systems provided by fSONA Communications Corporation. These systems usually involve large and expensive telescopes that need to be precisely aimed at the narrow beam transmitter, and are capable to provide megabits/s to gigabits/s communication links over hundreds of meters to a few kilometers. In narrow FOV FSO communication systems the transmitter and receiver must be accurately directed at each other. Therefore, narrow beam systems either require tracking to allow user mobility, or some sort of cellular architecture to allow multiple narrow beams to be used.

A typical FSO transmitter includes one or more optical radiating elements (sources), and an optical module to shape the beam and render it eyesafe, if required. Usually, Light Emitting Diodes (LED) and/or lasers are employed as the optical radiating elements.

A typical single-element receiver includes an optical concentrator to collect and concentrate incoming radiation, an optical filter to reject ambient illumination, and a photodetector to convert radiation to photo-current. Moreover, amplification, filtering and data recovery are then required. In a single-element receiver, the desired signal, ambient light noise, co-channel interference, and (often undesired) delayed multipath signal are combined in a single electrical signal. The inherent trade-off between range and angle of reception can be resolved by using an angle-diversity receiver, which utilizes multiple receiving elements that are pointed in different directions. The multiple receiving elements comprise an array of detectors for receiving communication signals from optical radiating elements, thereby allowing the system to cover a wide angle of reception.

The angle-diversity receiver reads the communication signal with a narrow Instantaneous Field Of View (I-FOV) from each single detector element. The photo-currents received in the various elements are amplified separately, and the resulting electrical signals can be processed using various methods (see, for example, J. M. Kahn, etc., "Imaging Diversity Receivers for high-speed Infrared Wireless Communication", IEEE Communications Magazine, December, 1998, PP. 88-94).

U.S. Pat. Publication No. 2003/020992 describes a free space optical communication network that includes plural stations, some capable of functioning as both transceivers and repeaters, and a station having such capability. The stations include a transmitter array having many optical emitter elements, each having an associated beam and a receiver having a receiver array with many optical detector element areas having beams corresponding with the beam of an emitter element of a transmitting optical station of the network. An optical arrangement associated with the arrays and the arrays themselves are such that beams associated with different elements of each array can be coupled with different stations of the network. The stations include one or more of the following features: (1) overlapping beams, (2) avalanche photodiodes in the receive array, (3) a filter arrangement for enabling only a desired wavelength to be transmitted from and received by the arrays, and (4) transmit and receive arrays at different locations in the stations so that photons emitted from the transmit array do not interfere with detectors of the receive array.

SUMMARY OF THE INVENTION

Despite prior art in the area of free space optical (FSO) communication, there is still a need in the art for further improvement in order to provide a novel point-to-point FSO communication system which does not require a node to be directly aimed at another node.

It would be advantageous to have a novel a wide-angular coverage communication system in which each of the nodes could be in relative motion with respect to another node while still maintaining communication.

The present invention partially eliminates disadvantages of FSO communication techniques and provides a novel free space optical (FSO) communication system comprising a receiver node and a transmitter node communicating to each other via a control data communication channel and an information data communication channel operating at a wavelength region different from the wavelength region of the control data communication channel.

According to an embodiment of the invention, the control data communication channel operates at a wavelength in the range of 1540 nm-1570 nm, whereas the information data communication channel operates at a wavelength in the range of 780 nm-980 nm.

According to an embodiment of the invention, the information data communication channel operates at a data bit rate greater than the data bit rate of the control data communication channel. For example, the information data communication channel operates at a data bit rate greater than 1 Mb/s, whereas the control data communication channel operates at a data bit rate of about 1 Kb/sec.

According to an embodiment of the invention, the receiver node includes a receiver unit, an interrogator unit, and a receiver node controller coupled to the receiver unit and to the interrogator unit. The receiver unit is configured to receive an information data signal provided by the transmitter node through the information data communication channel, and to recover information from said information data signal. The interrogator unit is configured for generating and radiating an interrogation data signal through the control data communication channel in order to initiate and terminate an information data communication session between the receiver node and the transmitter node. The receiver node controller is configured to monitor characteristics of the control data communication channel and information data communication channel, and to control operation of the receiver unit and the interrogator unit.

According to an embodiment of the invention, the receiver unit is a high sensitivity angle-diversity optical data receiver that includes: a receiving assembly configured for receiving the information data signal sent by the transmitter node; an array of detectors arranged downstream of the receiving assembly; and an information recovering unit configured for providing the information data recovered from the information data signal.

According to one embodiment of the invention, the receiving assembly includes an optical concentrator and a band pass spectral filter arranged downstream of the optical concentrator.

According to another embodiment of the invention, the receiving assembly includes a band pass spectral filter (and an optical concentrator arranged downstream of the band pass spectral filter.

According to one embodiment of the invention, the recovering unit includes an array of individual pre-amplifiers, one pre-amplifier per a photo-detector, coupled to the array of detectors; and an analog multiplexer coupled to the array of the pre-amplifiers and configured for recovering the information data from the information data signal.

According to another embodiment of the invention, the information recovering unit includes an analog multiplexer coupled to the array of detectors and configured for recovering the information data from the information data signal, and one pre-amplifier arranged downstream of the analog multiplexer.

According to an embodiment of the invention, the array of detectors includes a 2D array of photo-diodes (PD-A). For example, the array of detectors can include a back-illuminated silicon PIN photodiode array operating in the range of 250 nm-1100 nm. Preferably, but not mandatory, the PIN photodiode array is configured as a flip-chip bonded (FCB) to a read-out integrated circuit (ROIC).

According to an embodiment of the invention, the PIN photodiode array is reverse biased. A reverse bias voltage can be in the range of 5V-15V.

According to an embodiment of the invention, the band pass spectral filter has a pass band centered at about 850 nm.

According to a further embodiment of the invention, the receiver unit further comprises at least one additional amplification device selected from a transimpedance/limiting amplifier (TIA/LIA) and a line driver.

According to a further embodiment of the invention, the receiver node controller includes an electronic signal processor configured for controlling the interrogation unit, processing the information data, and relaying the information data signal to a communication output port. The signal processor is also configured to track the location of the optical communication signal within the photodiode array by selecting a specific photo-diode illuminated by the optical signal at a certain time.

According to an embodiment of the invention, the transmitter node includes a responder unit, a transmitter unit and a notifier unit coupled to the transmitter unit and to the responder unit. The responder unit is responsive to the interrogation data signal radiated by the interrogator unit and configured to locate the presence of the interrogator unit. The transmitter unit is configured to receive the digitally encoded data from an information source, generate and radiate the information data signal through the information data communication channel to the receiver unit. The notifier unit is configured to control operation of the transmitter unit and the responder unit.

According to an embodiment of the invention, the transmitter unit includes: a transmitter current driver coupled to an information source, a transmitter multiplexer arranged downstream of the current driver, a spatially multiplexed array of transmitters (SMART) arranged downstream of the multiplexer, and an optical beam shaping element arranged downstream of the SMART.

According to an embodiment of the invention, the interrogator unit includes: an interrogation signal generator, an interrogator transmitter electrically coupled to the interrogation signal generator, and an optical shaper element arranged downstream of the interrogator transmitter. The interrogation signal generator is configured for generating the interrogation data signal. The interrogator transmitter is configured to radiate the interrogation signal into a relatively large field of regard. For example, the interrogation data signal is an on-off keying (OOK) modulated signal. The interrogator transmitter can, for example, be a 1550 nm laser.

According to an embodiment of the invention, the responder unit includes an optical detector operating in a wide-field of view; and an optical band pass filter arranged upstream of the detector. For example, the optical detector can be selected from Ge detectors and InGaAs detectors operating in the range of about 700 nm to 2500 nm. When required, the responder unit can further include an amplifier configured for amplification of photo current signal generated by the optical detector. Preferably, the optical band pass filter of the responder unit is operable to pass the light in the wavelength range of about 1540 nm to 1570 nm.

According to one embodiment of the invention, the spatially multiplexed array of transmitters (SMART) includes a 2D array of laser emitters based on Vertical Cavity Surface Emitting Laser (VCSEL) technology. For example, the array of VCSELs is flip-chip packaged either to an ASIC or directly to a chip-carrier. The SMART can be selected to operate at a wavelength of about 850 nm.

According to another embodiment of the invention, the spatially multiplexed array of transmitters (SMART) includes a 2D array of laser emitters based on Resonant Cavity Light Emitting Diodes (RC-LED).

According to a further embodiment of the invention, the notifier unit includes a tracking mechanism configured for directing the radiation of the SMART towards the receiver node when the receiver node and/or transmitter node are mobile and move with respect to each other.

According to yet another embodiment of the invention, the notifier unit includes a radiation power adaptive mechanism configured for adaptive tuning the radiation power of the SMART depending on the exterior lighting.

The FSO communication system of the present invention has many of the advantages of the prior art techniques, while simultaneously overcoming some of the disadvantages normally associated therewith.

The FSO communication system according to the present invention can provide point-to-point communication which does not require a node to be directly aimed at another node. In this respect, the system is a wide-angular coverage communication system.

The FSO communication system according to the present invention allows each one of the nodes to be in relative motion with respect to the other while still keeping communication.

The FSO communication system can be readily scalable to larger or smaller formats by either increasing the power of emitters or reducing the number of the emitters, respectively.

The FSO communication system according to the present invention is of durable and reliable construction.

The FSO communication system according to the present invention may have a low manufacturing cost.

According to another aspect of the invention, there is provided a method for operation of the FSO communication system described above. According to an embodiment of the invention, the method includes a step of generating the interrogation data signal by the interrogator unit and radiating thereof towards the responder unit to initiate a communication session between the receiver node and the transmitter node, thereby establishing the control data communication channel. Then, responsive to the interrogation data signal, the method includes the step of beginning a search of the receiver unit by providing a raster scan of the transmitter light beams generated by the SMART in the direction of the receiver node. These transmitter light beams carry a search optical signal. After illumination of at least one photo-detector by the transmitter light beams carrying a search optical signal, the method provides the step of sending by the interrogator unit a coded control signal towards the responder unit through the control data communication channel for advising that the light signal radiated by a specific transmitter from the SMART is received by a specific photo-detector from the array of detectors. Then, the communication between the specific transmitter and the specific photo-detector is locked; thereby said information data communication channel is established. After locking, the information data signal can be transmitted through the information data communication channel.

When required, the method can further include the step of tracking the location of the optical information data communication signal within the photodiode array by selecting a specific photo-diode illuminated by the optical signal at a certain time.

When required, the method can also include adaptive tuning the radiation power of the SMART depending on the exterior lighting.

There has thus been outlined, rather broadly, the more important features of the invention so that the detailed description thereof that follows hereinafter may be better understood, and the present contribution to the art may be better appreciated. Additional details and advantages of the invention will be set forth in the detailed description.

BRIEF DESCRIPTION OF THE DRAWINGS

In order to understand the invention and to see how it may be carried out in practice, preferred embodiments will now be described, by way of non-limiting example only, with reference to the accompanying drawings, in which.

DETAILED DESCRIPTION OF THE PREFERRED EMBODIMENTS

The principles and operation of a FSO communication system according to the present invention may be better understood with reference to the drawings and the accompanying description. It being understood that these drawings are given for illustrative purposes only and are not meant to be limiting. The same reference numerals and alphabetic characters will be utilized for identifying those components which are common in the FSO system and its components shown in the drawings throughout the present description of the invention. It should be noted that the blocks in the figures are intended as functional entities only, such that the functional relationships between the entities are shown, rather than any physical connections and/or physical relationships.

Figure 1:
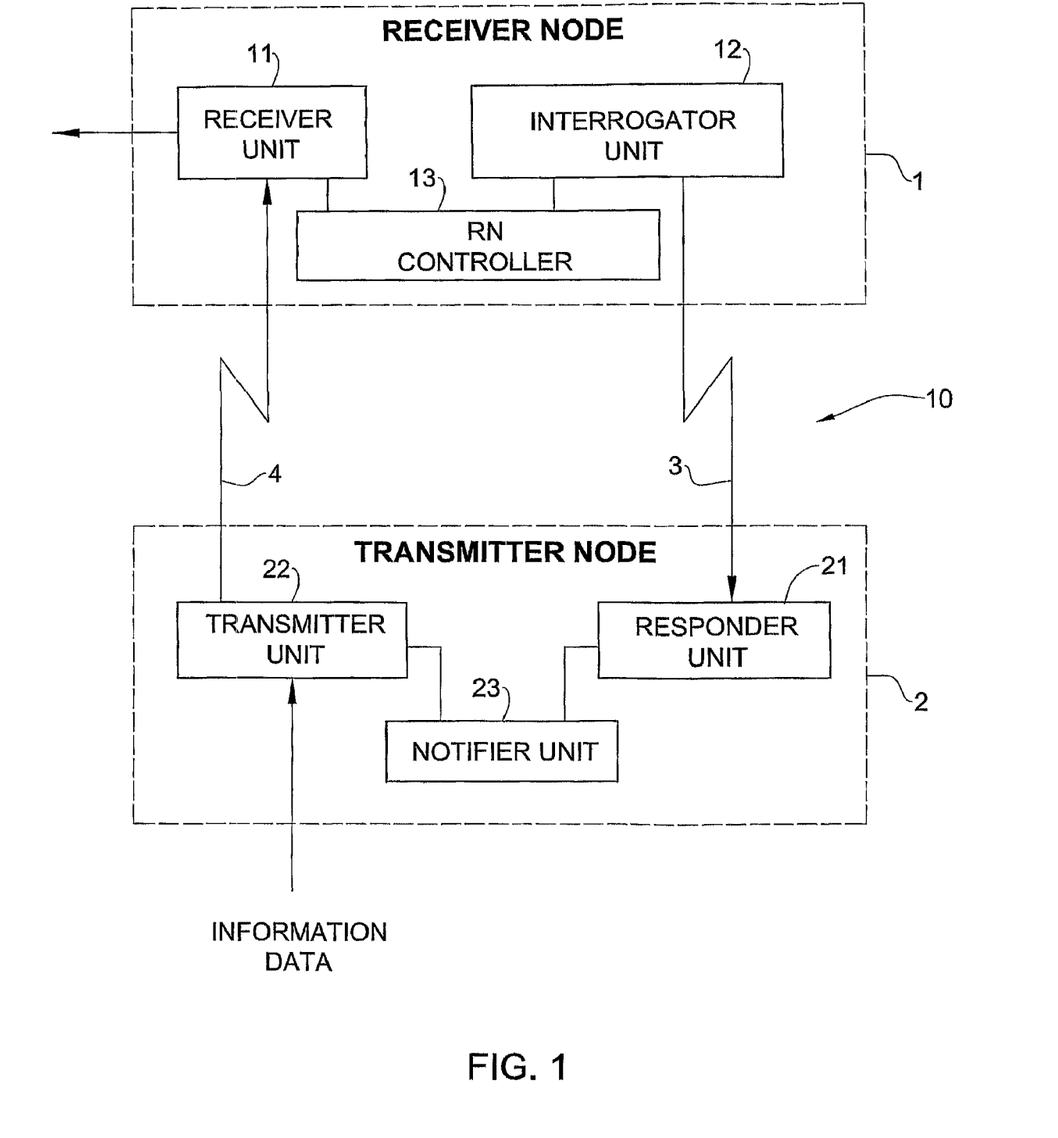
FIG. 1 is a schematic block diagram of a FSO system, in accordance with an embodiment of the present invention.

Referring to FIG. 1, a general schematic block diagram of a FSO system 10 for wireless communication is illustrated, in accordance with an embodiment of the present invention. The FSO system 10 includes a receiver node 1 and a transmitter node 2 communicating to each other via two optic communication channels, such as a control data communication channel 3 and an information data communication channel 4.

According to this embodiment of the invention, the system communication link is asymmetric, in which one node (receiver node 1) is configured to send control and command signals through the control data communication channel 3 at a relatively low data bit rate (e.g., about 1 Kb/sec), whereas the other node (transmitter node 2), in response to these control and command signals, is configured to send back information data to the receiver node through the information data communication channel at a relatively high bit rate (e.g., greater than 1 Mb/sec).

The information data communication channel 4 operates at a wavelength region different from the wavelength region of the control data communication channel 3. The information data communication channel 4 and the control data communication channel 3 are free space communication channels operated at two different wavelength regions, such as $\lambda inf$ and $\lambda int$, respectively. For example, $\lambda inf$ can be selected in the range of 1540 nm-1570 nm and $\lambda int$ can be selected in the range of 780 nm-980 nm.

The receiver node 1 includes a receiver unit 11, an interrogator unit 12, and a receiver node controller 13 coupled to the receiver unit 11 and to the interrogator unit 12. The receiver unit 11 is configured to receive the information data signal sent by the transmitter node 2 through the information data communication channel 4, to recover the information from this information data signal, and to provide the recovered information to a user (not shown). The interrogator unit 12 is configured for generating and radiating a time-modulated and encoded interrogation signal in order to initiate and terminate the communication session between the receiver node 1 and the transmitter node 2. The receiver node controller 13 is configured to monitor characteristics of the control data communication channel and information data communication channel, and control operation of the receiver unit 11 and the interrogator unit 12.

In turn, the transmitter node 2 includes a responder unit 21, a transmitter unit 22, and a notifier unit 23 coupled to the transmitter unit 21 and to the responder unit 22. The responder unit 21 is responsive to the interrogation data signal radiated by the interrogator unit, and configured to locate the presence of the interrogator unit in outdoor conditions. The transmitter unit 22 is configured to receive the digitally encoded data from an information source (not shown), to generate and radiate the information data signal through the information data communication channel to the receiver unit 11 by employing an adaptive and tracking optical emitter array (not shown in FIG. 1). The notifier unit 23 is coupled to the transmitter unit 21 and the responder unit 22, and configured to control operation thereof.

Preferably, the transmitter node 2 is designed to operate over very long periods, also when no information data transmission is required. Its sustained state is "stand-by" in which it dissipates very low electrical power. The notifier unit 23 is configured, inter alia, to awake the transmitter unit 22 in order to transmit information data when a trigger signal is received from the interrogator unit 12. The notifier unit 23 can return the transmitter node 2 to the "stand-by" regime when the communication with the interrogator unit 12 is ended.

Figure 2:
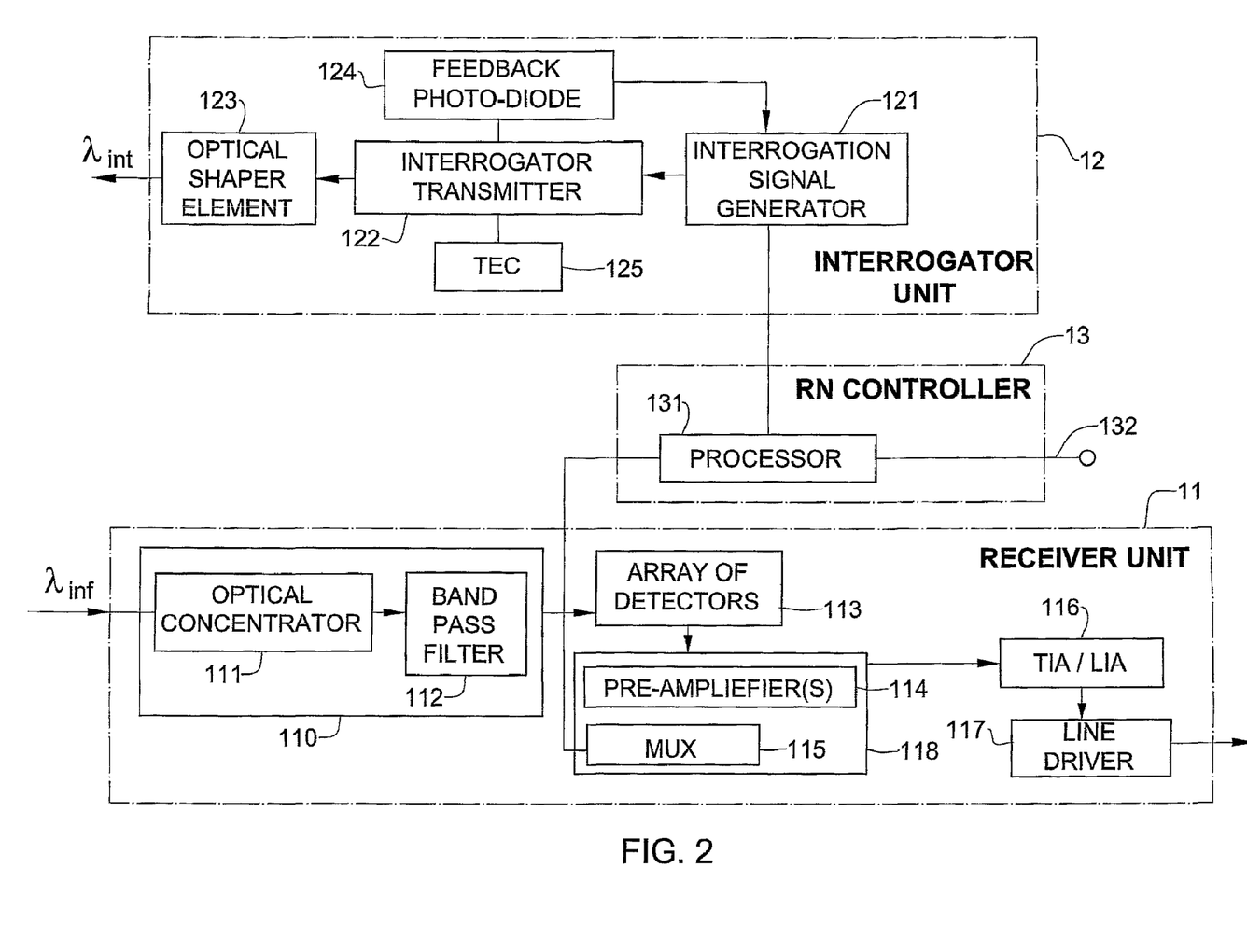
FIG. 2 is a schematic block diagram a receiver node is illustrated, according to an embodiment of the invention.

Referring to FIG. 2, a schematic block diagram of the receiver node 1 is illustrated, according to an embodiment of the invention. Specifically, the interrogator unit 12 includes an interrogation signal generator 121, an interrogator transmitter 122 electrically coupled to the interrogation signal generator 121, and an optical beam shaper element 123 arranged downstream of the interrogator transmitter 122. The interrogation signal generator 121 is configured for generating an interrogation signal that can, for example, be an on-off keying (OOK) modulated signal having a low rate (e.g., in the range of 1 to 10 KHz), although in principle any other digital encoding scheme may be used. The interrogation signal is fed to the interrogator transmitter 122 which is preferably a high power eyesafe laser transmitter, capable of transmitting into a relatively large field of regard. The interrogator transmitter 122 can, for example, be a 1550 nm laser module P/N C-1.5-1550 available from nLight Corporation. The interrogator transmitter 122 can be equipped with a thermoelectric (TEC) device 125 and a feedback photo-diode 124 configured for maintaining maximum optical power at the laser output by cooling the laser diode sub-mount, and allowing desired control of the laser electrical current by providing real-time feedback of the optical power to the laser control electronics. As will be shown hereinbelow, the interrogator transmitter is configured to radiate the interrogation signal for initiating and/or terminating a communication session between the receiver node 1 and the transmitter node 2. The optical shaper element 123 includes one or more beam shaping elements (not shown), such as lenses, diffraction elements (e.g., gratings), etc.

The receiver unit 11 is a high sensitivity angle-diversity optical data receiver that comprises a receiving assembly 110, an array of detectors 113 and an information recovering unit 118 configured for providing the information data recovered from the information data signal to a user (not shown).

The receiving assembly 110 includes an optical concentrator 111 and a band pass spectral filter 112 and configured for receiving the information data signal sent by the transmitter node 2.

According to one embodiment of the invention, the band pass spectral filter 112 is arranged downstream of the optical concentrator 111 configured for receiving the information data signal sent by the transmitter node 2.

According to another embodiment of the invention, the band pass spectral filter 112 can be configured for receiving the information data signal sent by the transmitter node 2. In this case, the optical concentrator 111 can be arranged downstream of the band pass spectral filter 112.

The optical concentrator 111 can, for example be, an imaging lens or a lens assembly. The band pass spectral filter 112 can, for example, be centered at about 850 nm. The array of detectors 113 includes a 2D array of photo-diodes (PD-A), where each photo-diode is capable of detecting a high speed optical signal. The receiver unit 11 covers a geometrical field of regard which is equal to or greater than the field of regard of the transmitter unit (22 in FIG. 1).

According to one embodiment of the invention, the information recovering unit 118 includes an array of individual pre-amplifiers 114, one pre-amplifier per a photo-detector, coupled to the array of detectors 113, and an analog multiplexer (MUX) 115 coupled to the array of the pre-amplifiers 114. Each photo-diode/pre-amplifier channel could be randomly accessed by means of the multiplexer 115 configured for recovering the information data from the optical signal received by the array of detectors 113.

According to another embodiment of the invention, the information recovering unit 118 includes an analog multiplexer 115 coupled to the array of detectors 113 and configured for recovering the information data from the information data signal, and a single pre-amplifier 114 arranged downstream of the analog multiplexer.

When required, the receiver unit 11 can further include one or more additional amplification devices, such as a transimpedance/limiting amplifier (TIA/LIA) 116 and/or a line driver 117.

According to one embodiment of the invention, the array of detectors 113 includes a back-illuminated silicon PIN photodiode array operating in the range of 250 nm-1100 nm. For example, the PIN photodiode array is a flip-chip bonded to a read-out integrated circuit (ROIC).

The back-illumination structure of the photodiode provides a relatively thick intrinsic layer of the p-i-n structure (preferably, thicker than 100 microns), thus the absorption length for photons is increased, and the quantum efficiency is augmented. According to this embodiment of the invention, the photodiode array is strongly reverse biased. Preferably, a reverse bias voltage is in the range of 5V-15V (that is in somewhat higher than the usual bias voltage utilized for PIN photodiodes that is in the range of 0-5V). Such a relatively high value of the bias voltage can reduce the number of thermally generated electrons in the intrinsic layer and increase the response time of the photodiode for faster communication rates, owing to decrease of the junction capacitance and elimination of the diffusion current component. Moreover, this feature can increase sensitivity of the photodiodes.

It should be appreciated by a person versed in the art that the use of back-illumination for the photodiodes may be less significant in the cases when at least one of the following features is met: the power budget allows the use of relatively low quantum efficiency photodiodes; a shorter wavelength light is utilized; and/or the photodiodes are manufactured from more expensive than silicon materials (e.g., germanium or indium gallium arsenide InGaAs).

The receiver node controller 13 represents a data acquisition and processing utility having a computer device including an electronic signal processor 131, which is preprogrammed by a suitable software model configured, inter alia, to control the interrogation signal generator 121 of the interrogator unit 12, to process the information signal at the output of the photo-diodes 113 detected from the optical signal, and to relay the information signal to a communication port 132 through which the user can provide commands for operating the receiver node. Examples of the commands include, but are not limited to, setting the receiver node on or off, starting or interrupting the operation of the interrogator, checking the status of a power source (e.g., battery), initiating a test for testing the receiver node, etc.

When required, the signal processor 131 is configured to track the location of the optical information data communication signal within the photodiode array by selecting a specific photo-diode illuminated by the optical signal at certain time. This feature allows the receiver node 1 to move freely with respect to the transmitter node 2 while maintaining that the information data communication channel be operational. The receiver node controller 13 may also include such devices as a memory unit that stores software-related data, information data received from the transmitter node, and control data intended to be transmitted by the interrogator unit; display; and other known devices (not shown), which may be necessary for regular operation of the electronic signal processor 131.

Figure 3:
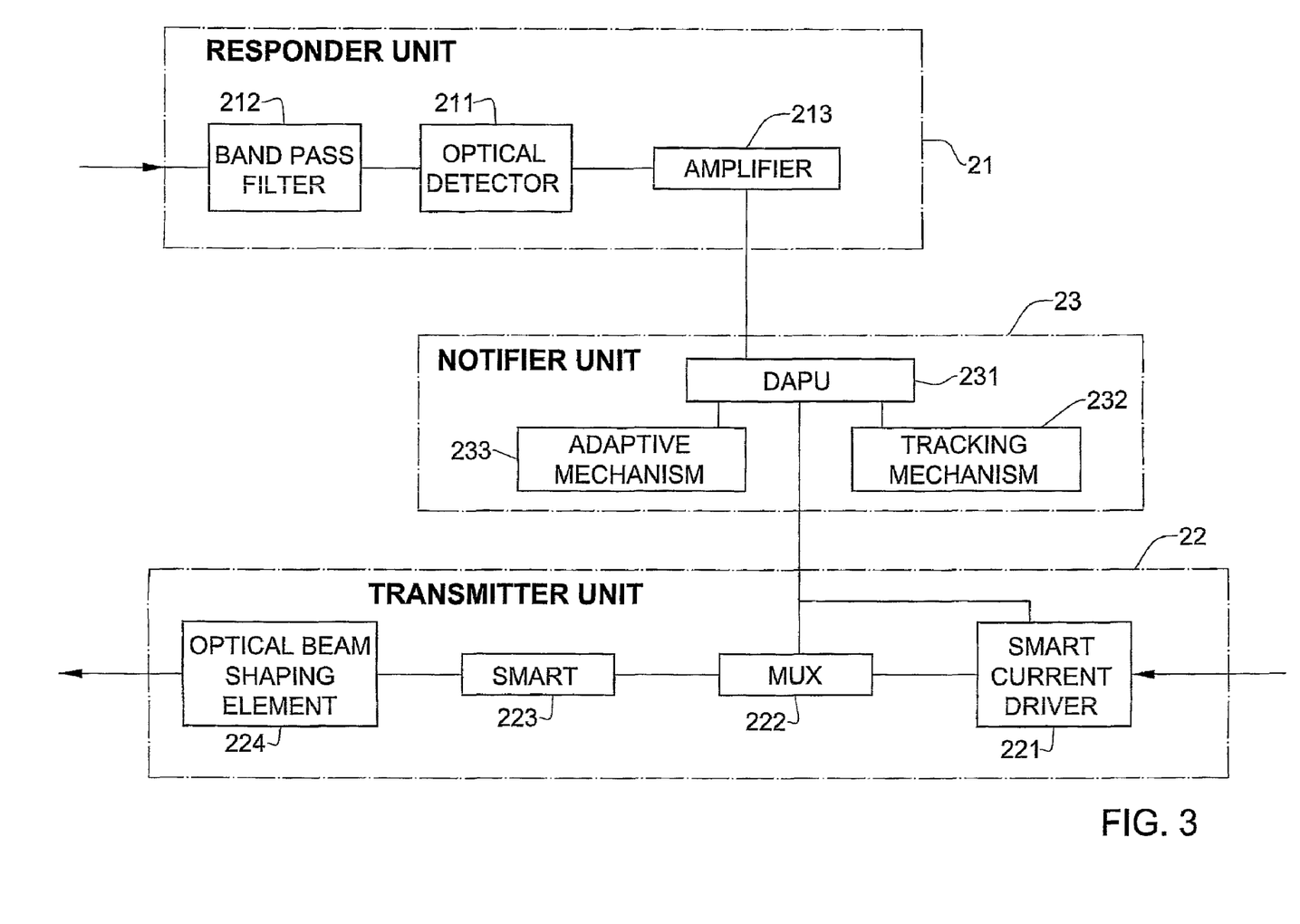
FIG. 3 is a schematic block diagram of transmitter node is illustrated, according to an embodiment of the invention.

Referring to FIG. 3, a schematic block diagram of the transmitter node 2 is illustrated, according to an embodiment of the invention. Specifically, the responder unit 21 includes an optical detector 211 operating in a wide-field of view. The optical detector 211 should be a high sensitivity detector sensitive to the signals sent by the interrogator laser transmitter (122 in FIG. 2). It operates all the time when the system is on, and is therefore configured to draw a negligible current. An example of the optical detector 211 includes, but is not limited to, Ge and InGaAs detectors operating in the range of about 700 nm to 2500 nm, and preferably, in the range of 1000 nm to 2500 nm. Such devices can, for example, be obtained from Judson Technologies, LLC. When required, the responder unit 21 can include an amplifier 213 configured for amplification of photo current signal generated by the optical detector 211.

For example, when the interrogator laser transmitter (122 in FIG. 2) operates in the range of about 1550 nm, the optical detector 211 can be equipped with an optical band pass filter 212 arranged upstream of the detector 211, and configured to pass the light only of interrogator laser radiation with negligible level of ambient light, e.g., the light only in the wavelength range of about 1540 nm to 1570 nm.

The transmitter unit 22 includes a transmitter current driver 221 coupled to an information source (not shown), a transmitter multiplexer 222 arranged downstream of the current driver 221, a spatially multiplexed array of transmitters (SMART) 223 arranged downstream of the multiplexer 222 and an optical beam shaping element 224 (e.g., a lens) arranged downstream of the SMART 223.

According to an embodiment of the invention, the SMART 221 includes a 2D array of laser emitters (not shown) which are randomly accessed by the electronics and used as a directional selective transmitter.

According to one example, the 2D array of laser emitters can be based on Vertical Cavity Surface Emitting Laser (VCSEL) technology. In such a case, the array of VCSELs can be flip-chip packaged either to an ASIC or directly to a chip-carrier. According to this embodiment of the invention, the SMART 223 are selected to operate at the wavelength of 850 nm. VCSELs for wavelengths from 650 nm to 1300 nm are typically based on gallium arsenide (GaAs) wafers and can be available, for example, from ULM Photonics GmbH. VCSELs operating at longer wavelengths, e.g., 1000-1550, are typically are typically based on InGaAsP epitaxial layers and can be available, for example, from BeamExpress.

According to another example, the 2D array of laser emitters can be based on Resonant Cavity Light Emitting Diodes (RC-LED) described in the articles by D. C. O'Brien, et al., Proc. SPIE Vol. 4214, P. 104-114, Optical Wireless Communications III, Eric J. Korevaar; Ed, Proc. SPIE Vol. 4530, P. 145-153, Optical Wireless Communications IV, Eric J. Korevaar; Ed., the disclosures of which are incorporated hereby by reference into this description.

The notifier unit 23 includes a data acquisition and processing utility (DAPU) 231 having a computer device including such known utilities as a processor, a memory and a monitor. The processor is preprogrammed by a suitable software model configured to analyze signals provided by the responder unit 21. For example, when the receiver node sends data indicative that the light signal radiated by the transmitter unit 22 is received by a certain photo-diode(s) of the receiver unit 11, the notifier unit 23 generates a notification that includes a specification of that specific photo-diode(s). This notification is used for locking the communication between the specific emitter (that radiated the optic signal used for establishing this communication) and the specific photo-diode(s).

According to a further embodiment of the invention, the notifier unit 23 includes a tracking mechanism 232 configured for directing the radiation of the spatially multiplexed array of transmitters (SMART) 223 towards the receiver node 1 when the receiver node 1 and/or transmitter node 2 are mobile and move with respect to each other. In operation, the controller 13 measures the received power at a certain photo-diode, and if this power is lower than a predetermined value, the controller generates a command for searching a photo-diode which produces a signal having larger magnitude at the adjacent neighbors of the photodiode which produces the low signal. The tracking is required for directing the radiation of the SMART towards the receiver node when the receiver node and/or transmitter node are mobile and move with respect to each other. Moreover, tracking mechanism 232 can be used for fine tuning the reception by optimizing the election of optimal photo-diode from the set, even when the receiver node and/or transmitter node are stationary.

According to yet another embodiment of the invention, the notifier unit 23 includes a radiation power adaptive mechanism 233 configured for adaptive tuning the radiation power of the SMART 223 depending on the exterior (ambient) lighting and the distance between the receiver node 1 and the transmitter node 2. For example, the radiation power of the SMART 223 increases when the distance is long and/or the intensity of the ambient light is high.

Figure 4:
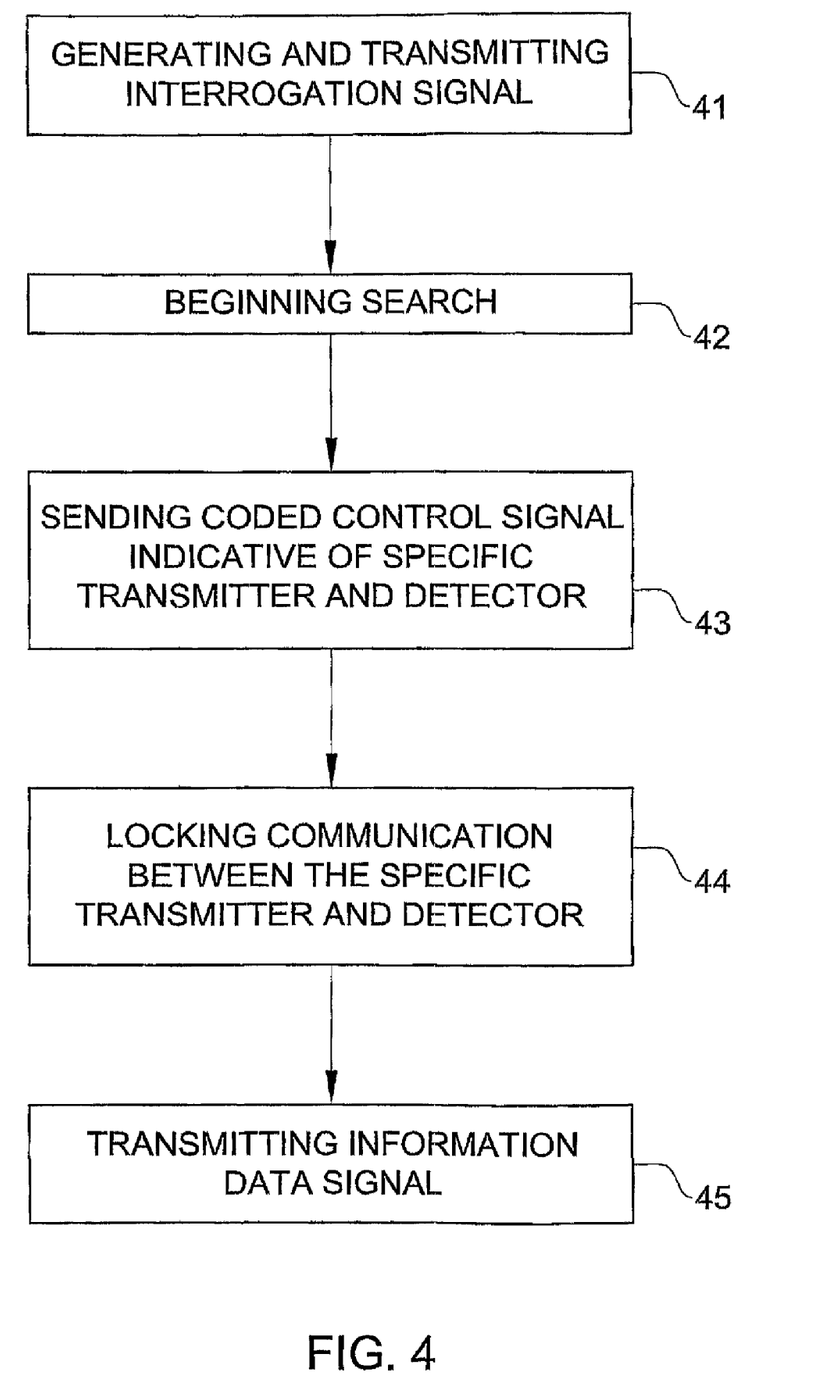
FIG. 4 is a flow-chart diagram illustrating operation of the FSO system, according to an embodiment of the invention.

Referring to FIGS. 1 through 4 together, communication between the receiver node 1 and the transmitter node 2 is accomplished through the control data communication channel 3 and an information data communication channel 4. FIG. 4 illustrates operation of the FSO system of the invention, according to an embodiment of the invention. The interrogator unit 12 of the receiver node 1 initiates a communication session and provides a control communication channel (block 41 in FIG. 4) by illuminating a certain field of view with an interrogation signal radiated by the interrogator transmitter 122. The interrogation signal is a time-modulated and encoded pattern that can, for example, be an on-off keying (OOK) modulated signal having a low rate (e.g., about 2.5 KHz), although in principle any other digital encoding scheme may be used. The interrogation signal carries a "wake-up" command for the transmitter node 2 that was in a "stand-by" regime.

If the transmitter node 2 is located within the field of view of the interrogation pattern, its responder unit 21 detects this encoded light pattern and responds to the interrogation signal by establishing a "wake-up" regime. In the "wake-up" regime the transmitter unit 22 begins a search (block 42 in FIG. 4) of the receiver unit 11. The search is provided by generating a raster scan of the transmitter light beams generated by the SMART 221. The SMART 221 transmits a search optical signal in the direction of the receiver node 1. The raster scan mode continues as long as at least one communication link is established between the transmitter unit 22 and the receiver unit 11. The information communication link is established when at least one photo-diode (e.g., one to four) of the array of detectors 113 is illuminated by the SMART 221. In case of the illumination, the receive node controller 13 instructs the interrogator unit to send (block 43 in FIG. 4) a coded control identification signal towards the responder unit 21 advising that the light signal radiated by a certain transmitter is received by a specific photo-detector(s). This identification signal can, for example, include a certain code associated with these specific transmitter and/or photo-detector(s). This information is analyzed by the notifier unit 23 that generates a notification that includes, inter alia, a specification of that specific photo-diode(s). This notification is used for locking (block 44 in FIG. 4) the communication between the specific transmitter (that radiated the optic signal used for establishing this communication) and the specific photo-detector(s). Hence, further illumination provided by the SMART 221 carrying the information data is directed towards this specific detector (block 45 in FIG. 4), thereby maintaining the established information communication channel between this specific transmitter from the SMART 221 and the specific photo-diode(s) from the array of detectors 113.

As such, those skilled in the art to which the present invention pertains, can appreciate that while the present invention has been described in terms of preferred embodiments, the conception, upon which this disclosure is based, may readily be utilized as a basis for the designing of other structures systems and processes for carrying out the several purposes of the present invention.

It should be understood that the exemplary configuration of the FSO communication system shown in FIG. 1 is asymmetric, i.e., one node is configured for transmitting information data signal, whereas another node is configured for receiving information data signal. However, when required, the FSO communication system can have a symmetric configuration. In such a case, each node (communication device) can include an interrogator unit and a responder unit, and therefore any node can initiate uplink and downlink control communication sessions.

It is apparent that the free space communication system of the present invention is not bound to the examples of the optic communication. When required, the control communication channel and/or information data communication channel can be based on any other types of wireless communication, e.g., RF communication.

It should be understood that although the exemplary configuration of the FSO communication system described above includes one receiver node and one transmitter node, generally, the concept of the invention can be extended, mutates mutandis, to a FSO communication system including any number of receiver and transmitter nodes.

It is to be understood that the phraseology and terminology employed herein are for the purpose of description and should not be regarded as limiting.

It is important, therefore, that the scope of the invention is not construed as being limited by the illustrative embodi-

What is claimed is:

1. A free space optical (FSO) communication system comprising a receiver node (1) and a transmitter node (2) communicating to each other via a control data communication channel and an information data communication channel operating at a wavelength region different from the wavelength region of the control data communication channel,
said receiver node (1) including:
(i) a receiver unit (11) configured to receive an information data signal provided by the transmitter node through the information data communication channel, and to recover information from said information data signal, wherein said receiver unit (11) is a high sensitivity angle-diversity optical data receiver that includes:
a receiving assembly (110) configured for receiving the information data signal sent by the transmitter node (2);
an array of detectors (113) arranged downstream of said receiving assembly;
an information recovering unit (118) configured for providing the information data recovered from the information data signal;
(ii) an interrogator unit (12) configured for generating and radiating an interrogation data signal through the control data communication channel in order to initiate and terminate an information data communication session between the receiver node (1) and the transmitter node (2); and
(iii) a receiver node controller (13) coupled to the receiver unit (11) and to the interrogator unit (12) and configured to monitor characteristics of the control data communication channel and information data communication channel, and to control operation of the receiver unit (11) and the interrogator unit (12);
said transmitter node (2) including:
(iv) a responder unit (21) being responsive to said interrogation data signal radiated by the interrogator unit (12) and configured to locate the presence of the interrogator unit (12);
(v) a transmitter unit (22) configured to receive the digitally encoded data from an information source, generate and radiate the information data signal through said information data communication channel to the receiver unit (11), wherein the transmitter unit (22) includes:
a transmitter current driver (221) coupled to an information source,
a transmitter multiplexer (222) arranged downstream of the current driver (221),
a spatially multiplexed array of transmitters (SMART) (223) arranged downstream of the multiplexer (222); and
an optical beam shaping element (224) arranged downstream of the SMART (223);
and
(vi) a notifier unit (23) coupled to the transmitter unit (21) and to the responder unit (22), and configured to control operation thereof.

2. The FSO communication system of claim 1, wherein said control data communication channel operates at a wavelength in the range of 1540 nm-1570 nm.

3. The FSO communication system of claim 1, wherein said information data communication channel operates at a wavelength in the range of 780 nm-980 nm.

4. The FSO communication system of claim 1, wherein the information data communication channel operates at a data bit rate greater than the data bit rate of the control data communication channel.

5. The FSO communication system of claim 4, wherein the information data communication channel operates at a data bit rate greater than 1 Mb/s.

6. The FSO communication system of claim 4, wherein the control data communication channel operates at a data bit rate of about 1 Kb/sec.

7. The FSO communication system of claim 1, wherein said receiving assembly (110) includes an optical concentrator (111) and a band pass spectral filter (112) arranged downstream of the optical concentrator (111).

8. The FSO communication system of claim 1, wherein said receiving assembly (110) includes a band pass spectral filter (112) and an optical concentrator (111) arranged downstream of the band pass spectral filter (112).

9. The FSO communication system of claim 1, wherein said information recovering unit (118) includes an analog multiplexer (115) coupled to said array of detectors (113) and configured for recovering the information data from the information data signal, and a pre-amplifier (114) arranged downstream of said analog multiplexer (115).

10. The FSO communication system of claim 1, wherein the interrogator unit (12) includes:
an interrogation signal generator (121) configured for generating said interrogation data signal;
an interrogator transmitter (122) electrically coupled to the interrogation signal generator (121), and configured to radiate the interrogation signal into a relatively large field of regard, and
an optical shaper element (123) arranged downstream of the interrogator transmitter (122).

11. The FSO communication system of claim 1, wherein said receiver unit (11) further comprises at least one additional amplification device selected from a transimpedance/limiting amplifier (TIA/LIA) (116) and a line driver (117).

12. The FSO communication system of claim 1, wherein the array of detectors (113) includes a back-illuminated silicon PIN photodiode array operating in the range of 250 nm-1100 nm.

13. The FSO communication system of claim 1, wherein said array of detectors (113) includes a 2D array of photodiodes (PD-A).

14. The FSO communication system of claim 1, wherein the receiver node controller (13) includes an electronic signal processor (131) configured for controlling the interrogation unit (12), processing the information data, and relaying the information data signal to a communication output port (132).

15. The FSO communication system of claim 14 wherein the signal processor (131) is configured to track the location of the optical communication signal within the photodiode array by selecting a specific photo-diode illuminated by the optical signal at certain time.

16. The FSO communication system of claim 1, wherein the responder unit (21) includes:
an optical detector (211) operating in a wide-field of view; and
an optical band pass filter (212) arranged upstream of the detector (211).

17. The FSO communication system of claim 1, wherein the responder unit (21) further includes an amplifier (213) configured for amplification of photo current signal generated by the optical detector (211).

18. The FSO communication system of claim 1, wherein the SMART (223) include a 2D array of laser emitters based on Vertical Cavity Surface Emitting Laser (VCSEL) technology.

19. The FSO communication system of claim 1, wherein the SMART (223) include a 2D array of laser emitters based on Resonant Cavity Light Emitting Diodes.

20. The FSO communication system of claim 1, wherein the notifier unit (23) includes a tracking mechanism (232) configured for directing the radiation of the SMART (223) towards the receiver node (1) when the receiver node (1) and/or transmitter node (2) are mobile and move with respect to each other.

21. The FSO communication system of claim 1, wherein the notifier unit (23) includes a radiation power adaptive mechanism (233) configured for adaptive tuning the radiation power of the SMART (223) depending on the exterior lighting.

22. A method for operation of the FSO communication system of claim 1, comprising:
 (a) generating the interrogation data signal by the interrogator unit (12) and radiating thereof towards the responder unit (21) to initiate a communication session between the receiver node (1) and the transmitter node (2), thereby establishing said control data communication channel;
 (b) responsive to the interrogation data signal, beginning a search of the receiver unit (11) by providing a raster scan of the transmitter light beams generated by the SMART (223) in the direction of the receiver node (1), said transmitter light beams carrying a search optical signal;
 (c) after illumination of at least one photo-detector (113) by said transmitter light beams carrying a search optical signal, sending by the interrogator unit (12) a coded control signal towards the responder unit (21) through the control data communication channel advising that the light signal radiated by a specific transmitter from the SMART (223) is received by a specific photo-detector from the array of detectors (113);
 (d) locking the communication between said specific transmitter and said specific photo-detector; thereby establishing said information data communication channel; and
 (e) transmitting said information data signal through said information data communication channel.

23. The method of claim 22, comprising tracking the location of the optical information data communication signal within the photodiode array by selecting a specific photodiode illuminated by the optical signal at a certain time.

24. The method of claim 22, comprising adaptive tuning the radiation power of the SMART depending on the exterior lighting.

* * * * *